US009812172B2

(12) United States Patent
Mugimoto et al.

(10) Patent No.: US 9,812,172 B2
(45) Date of Patent: Nov. 7, 2017

(54) VIDEO-PROCESSING APPARATUS, VIDEO-PROCESSING SYSTEM, AND VIDEO-PROCESSING METHOD

(71) Applicant: PFU LIMITED, Kahoku-shi, Ishikawa (JP)

(72) Inventors: Toru Mugimoto, Ishikawa (JP); Yoshikazu Takabatake, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 22 days.

(21) Appl. No.: 15/053,910

(22) Filed: Feb. 25, 2016

(65) Prior Publication Data

US 2017/0140794 A1 May 18, 2017

(30) Foreign Application Priority Data

Nov. 13, 2015 (JP) ................................. 2015-223205

(51) Int. Cl.
*H04N 9/475* (2006.01)
*G11B 27/10* (2006.01)
*H04N 5/222* (2006.01)

(52) U.S. Cl.
CPC ............ *G11B 27/10* (2013.01); *H04N 5/222* (2013.01)

(58) Field of Classification Search
CPC ......... H04N 19/44; H04N 19/70; G11B 27/10
USPC ....................................................... 348/516
See application file for complete search history.

(56) References Cited

U.S. PATENT DOCUMENTS

| 5,715,013 A * | 2/1998 | Kang ................... H04N 7/0122 348/561 |
| 5,963,200 A * | 10/1999 | Deering ................ G06F 3/1446 345/1.2 |
| 2001/0026326 A1* | 10/2001 | Itaki ...................... G06F 3/1446 348/383 |
| 2010/0110062 A1 | 5/2010 | Kennedy et al. |
| 2016/0119507 A1* | 4/2016 | Duyvejonck ........ H04N 9/3147 348/512 |

FOREIGN PATENT DOCUMENTS

| JP | 2003-114707 A | 4/2003 |
| JP | 2008-051848 A | 3/2008 |
| JP | 2010-074497 A | 4/2010 |
| JP | 2011-211676 A | 10/2011 |
| JP | 2014-147052 A | 8/2014 |

OTHER PUBLICATIONS

Office Action issued in corresponding Japanese Patent Application No. 2015-223205, dated Jan. 4, 2017..

* cited by examiner

*Primary Examiner* — Michael Lee
(74) *Attorney, Agent, or Firm* — McDermott Will & Emery LLP (57) ABSTRACT

According to the present disclosure, a master decoder acquires a generator synchronization signal for synchronization of video data based on a reference signal supplied from a synchronization signal generator, selects the generator synchronization signal as a selected synchronization signal to transmit the selected synchronization signal to the slave decoder via an internal bus, and outputs the video data based on the selected synchronization signal, and the slave decoder outputs the video data based on the selected synchronization signal transmitted from the master decoder.

15 Claims, 8 Drawing Sheets

VIDEO-PROCESSING APPARATUS, VIDEO-PROCESSING SYSTEM, AND VIDEO-PROCESSING METHOD

CROSS-REFERENCE TO RELATED APPLICATION

This application is based upon and claims the benefit of priority from Japanese Patent Application No. 2015-223205, filed on Nov. 13, 2015, the entire contents of which are incorporated herein by reference.

BACKGROUND OF THE INVENTION

1. Field of the Invention

The present disclosure relates to a video-processing apparatus, a video-processing system, and a video-processing method.

2. Description of the Related Art

Conventionally, the technique of selecting a synchronization signal has been disclosed.

The following technique has been disclosed (see, JP-A-2003-114707): any one of a plurality of data lines is selected to transmit a synchronization signal to other control boards, and on a control board side, a signal from one of the data lines from which a change has been detected is selected and set as a synchronization signal.

The following technique has been also disclosed (see, JP-A-2010-74497): a synchronization signal extracted from one of video signals output from a plurality of signal processors and a synchronization signal generated based on time information supplied via a network are selected for synchronization of video data to be output.

However, according to the conventional device (JP-A-2003-114707 or the like), in the case of receiving a reference signal supplied from a synchronization signal generator or the like provided outside the device, there is a disadvantage that it is required that, the synchronization signal generator or the like is, via a coaxial cable etc., connected to each of a plurality of modules for outputting video data to supply the reference signal.

SUMMARY OF THE INVENTION

It is an object of the present disclosure to at least partially solve the problems in the conventional technology.

An video-processing apparatus according to one aspect of the present disclosure includes a master decoder serving as a decoder module connected to a synchronization Signal generator, and a slave decoder serving as a decoder module not connected to the synchronization signal generator, wherein the master decoder includes a generator synchronization signal acquiring unit that acquires a generator synchronization signal for synchronization of video data based on a reference signal supplied from the synchronization signal generator, a synchronization signal selecting unit that selects the generator synchronization signal as a selected synchronization signal to transmit the selected synchronization signal to the slave decoder via an internal bus, and a master output controlling unit that outputs the video data based on the selected synchronization signal, and the slave decoder includes a slave output controlling unit that outputs the video data based on the selected synchronization signal transmitted from the master decoder.

A video-processing system according to another aspect of the present disclosure includes a transmitting device connected to a photographing device connected to a photographing-side synchronization signal generator and configured to acquire video data and a receiving device including a master decoder serving as a decoder module connected to a decoder-side synchronization signal generator and a slave decoder serving as a decoder module not connected to the decoder-side synchronization signal generator are communicatively connected together, wherein the transmitting device includes a video data acquiring unit that acquires the video data transmitted from the photographing device based on a generator synchronization signal acquired from a reference signal supplied from the photographing-side synchronization signal generator, and a network transmitting unit that transmits the video data via a network, and the receiving device includes a network receiving unit that receives the video data via the network, the master decoder including a generator synchronization signal acquiring unit that acquires a generator synchronization signal for synchronization of the video data based on a reference signal supplied from the decoder-side synchronization signal generator connected to the master decoder, a synchronization signal selecting unit that selects the generator synchronization signal as a selected synchronization signal to transmit the selected synchronization signal to the slave decoder via an internal bus, and a master output controlling unit that outputs the video data based on the selected synchronization signal, and the slave decoder including a slave output controlling unit that outputs the video data based on the selected synchronization signal transmitted from the master decoder.

An video-processing method according to still another aspect of the present disclosure executed by a video-processing apparatus including a master decoder serving as a decoder module connected to a synchronization signal generator, and a slave decoder serving as a decoder module not connected to the synchronization signal generator, the method executed by the video-processing apparatus includes a generator synchronization signal acquiring step of acquiring a generator synchronization signal for synchronization of video data based on a reference signal supplied from the synchronization signal generator at the master decoder, a synchronization signal selecting step of selecting the generator synchronization signal as a selected synchronization signal to transmit the selected synchronization signal to the slave decoder via an internal bus at the master decoder, a master output controlling step of outputting the video data based on the selected synchronization signal at the master decoder, and a slave output controlling step of outputting the video data based on the selected synchronization signal transmitted from the master decoder at the slave decoder.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A video-processing apparatus, a video-processing system, and a video-processing method according to an embodiment of the present disclosure will be described in detail below with reference to drawings. Note that the present disclosure is not limited to this embodiment.

Configuration of the Present Embodiment

Figure 1:
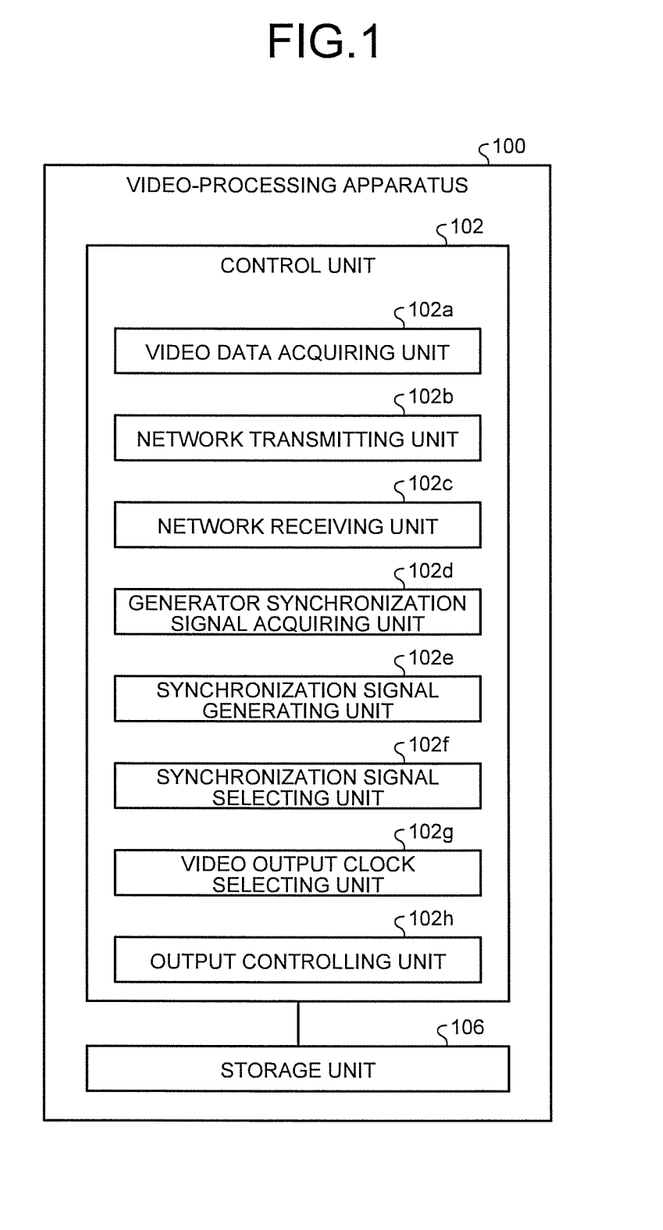
FIG. 1 is a block diagram of an example of the configuration of a video-processing apparatus of an embodiment.

An example of the configuration of a video-processing apparatus 100 according to the embodiment of the present disclosure will be described below with reference to FIGS. 1 and 2, and then, processing etc. according to the present embodiment will be described in detail. FIG. 1 is a block diagram of the example of the configuration of the video-processing apparatus 100 according to the present embodiment.

In the embodiment described below, the video-processing apparatus 100 will be described as an example in order to specify the technical idea of the present disclosure. It is not intended to limit the present disclosure to the video-processing apparatus 100, and the present disclosure is applicable equally to video-processing apparatuses 100 of other embodiments included in the scope of the claims.

For example, function distribution of the video-processing apparatus 100 described as an example in the present embodiment is not limited to the configuration described later. The video-processing apparatus 100 can be configured in such a manner that any units are functionally or physically separated or integrated, as long as similar advantageous effects and functions can be exhibited.

First, the video-processing apparatus 100 includes, as schematically illustrated in FIG. 1, a control unit 102 and a storage unit 106. These sections of the video-processing apparatus 100 are communicatively connected together via an optional communication path (an internal bus or the like). Moreover, the video-processing apparatus 100 may be communicatively connected to an external device via a network 300.

The video-processing apparatus 100 may include a master decoder which is a decoder module connected to a synchronization signal generator (decoder-side synchronization signal generator) 200, and a slave decoder which is a decoder module not connected to a synchronization signal generator 200.

The video-processing apparatus 100 may be connected to a photographing device 400 connected to a synchronization signal generator (photographing-side synchronization signal generator) 200 and configured to acquire video data.

The video-processing apparatus 100 may further include any one, some, or all of an input/output unit, an input/output interface unit, and a communication interface unit, these sections having the function of performing data input/output (I/O) (these sections are not shown).

The input/output unit may be a key input unit, a touch panel, a control pad (a touch pad, a game pad or the like), a mouse, a keyboard, or a microphone, for example.

The input/output unit may be a display unit (a display, a monitor, a touch panel made of crystal liquid or organic EL or the like) configured to display information (input/output information) such as an application. Moreover, the input/output unit may be a sound output unit (a speaker or the like) configured to output sound information as sound.

The input/output interface unit may be a video input/output interface unit such as a Serial Digital Interface (SDI) terminal, an registered trademark) (High-Definition Multimedia Interface (HDMI) terminal, or a Display port terminal.

The synchronization signal generator 200, the photographing device 400 such as a camera, or a recorder may be connected to an end of an input port forming the input/output interface unit, and an output device (a monitor or a display) 500 or a recorder may be connected to an end of an output port forming the input/output interface unit, for example.

The communication interface unit may be a network interface configured to receive/transmit IP data via any one or both of wire communication and wireless communication (WiFi or the like), or an interface configured to perform wireless communication via Bluetooth (registered trademark), for example.

The storage unit 106 stores any one, some, or all of various types of database, tables, files, and buffers (a direct memory access (DMA) buffer or the like), for example.

The storage unit 106 may store video data, ancillary (ANC) data, and packets, for example. Moreover, the storage unit 106 may store various types of application programs (a user application or the like).

The storage unit 106 is a storage unit, and can use any one, some, or all of a memory such as a RAM/ROM, a fixed disk device such as an Hard Disk Drive (HDD), an Solid State Drive (SSD), a flexible disk, and an optical disk, for example.

In the storage unit 106, a computer program or the like for providing an instruction to a Central Processing Unit (CPU) to perform various types of processing may be stored.

The control unit 102 includes an CPU and the like configured to control the video-processing apparatus 100 in a comprehensive manner. The control unit 102 has an internal memory configured to store a control program, a program specifying various types of processing steps etc., and required data, and based on these programs, performs the information processing for executing various types of processing.

The control unit 102 functionally includes a video data acquiring unit 102a, a network transmitting unit 102b, a network receiving unit 102c, a generator synchronization signal acquiring unit 102d, a synchronization signal generating unit 102e, a synchronization signal selecting unit 102f, a video output clock selecting unit 102g, and an output controlling unit 102h.

The video data acquiring unit 102a acquires video data. The video data acquiring unit 102a may acquire video data transmitted from the photographing device 400 based on a generator synchronization signal acquired from a reference signal supplied from the synchronization signal generator 200 or the like.

The reference signal may be a common reference signal as a reference signal for synchronization of a plurality of broadcast video apparatuses.

The network transmitting unit 102b transmits video data via the network 300.

The network receiving unit 102c receives video data via the network 300.

The generator synchronization signal acquiring unit 102d acquires a generator synchronization signal for synchronization of video data. The generator synchronization signal acquiring unit 102d may acquire a generator synchronization signal for synchronization of video data based on a reference signal supplied from the synchronization signal generator 200.

The reference signal may match a reference signal supplied from the synchronization signal generator 200 to the photographing device 400 connected to the synchronization signal generator 200 and configured to acquire video data.

The synchronization signal generating unit 102e generates a master synchronization signal different from a generator synchronization signal.

The synchronization signal selecting unit 102f selects a generator synchronization signal as a selected synchronization signal to transmit such a signal to other decoder modules (slave decoders or the like) via the internal bus. The synchronization signal selecting unit 102f may receive the selected synchronization signal via the internal bus.

Alternatively, the synchronization signal selecting unit 102f may select a generator synchronization signal or a master synchronization signal as a selected synchronization signal to transmit such a signal to other decoder modules (slave decoders or the like) via the internal bus.

The video output clock selecting unit 102g selects a video output clock based on a video format of video data.

The output controlling unit 102h outputs video data. The output controlling unit 102h may output video data based on a selected synchronization signal. Alternatively, the output controlling unit 102h may output video data based on a selected synchronization signal transmitted from other decoder module (a master decoder or the like).

As still another alternative, the output controlling unit 102h may synchronize, based on a selected synchronization signal, a video output clock and a head of a frame with each other to output video data.

Next, an example of the hardware configuration of the video-processing system of the present embodiment will be described with reference to FIG. 2. FIG. 2 is a hardware configuration diagram of the example of the video-processing system of the present embodiment.

Figure 2:
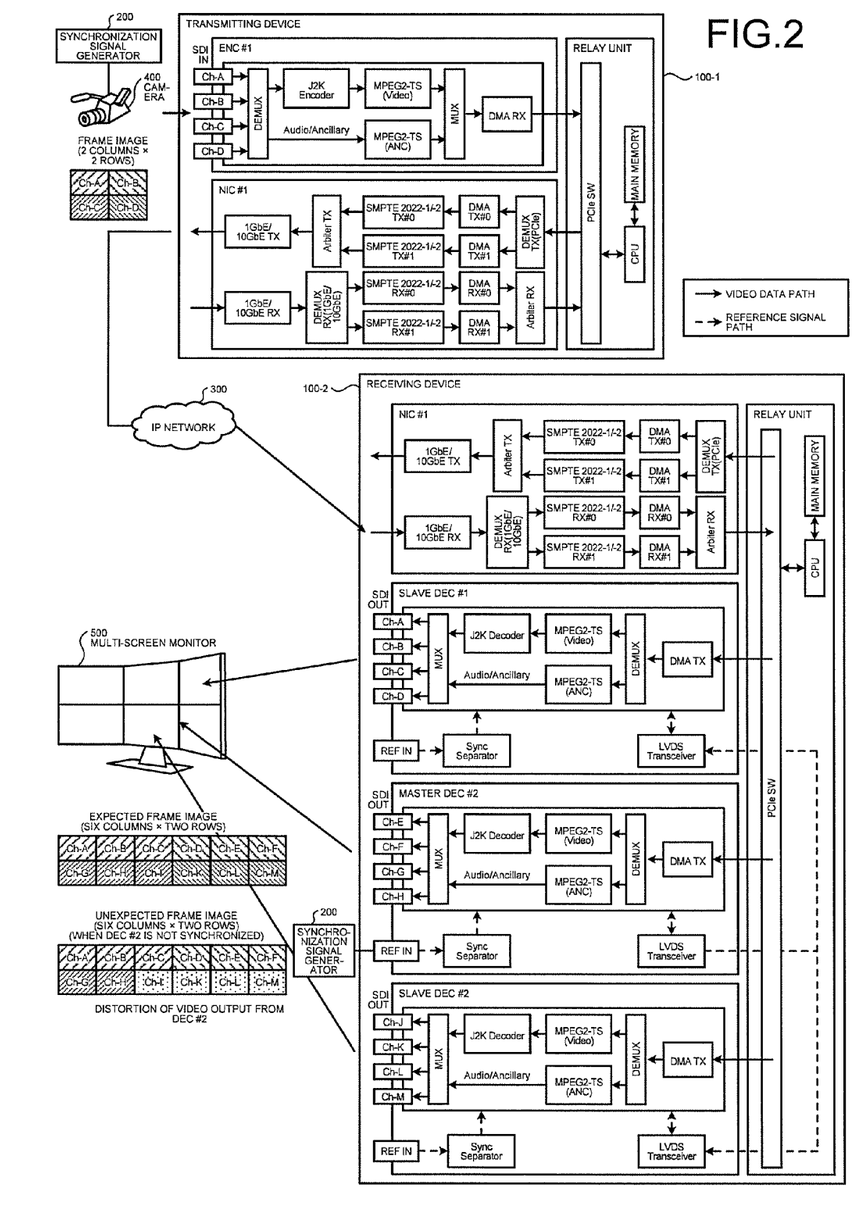
FIG. 2 is a hardware configuration diagram of the example of the configuration of a video-processing system of the embodiment.

As shown in FIG. 2, the video-processing system is schematically configured such that a video-processing apparatus (a transmitting device) 100-1 and a video-processing apparatus (a receiving device) 100-2 are communicatively connected together via the network 300.

The video-processing apparatus 100 has a module configuration, and by a module change, is switchable between the configuration in which the video-processing apparatus 100 receives input video/ANC data to transmit such data to the network 300 and the configuration in which the video-processing apparatus 100 outputs the received video/ANC data to the monitor 500 or the like.

That is, the video-processing apparatus 100 may selectively include any one, some, or all of an encoder module (ENC) configured to acquire (receive) video/ANC data from the photographing device (the camera) 400, an Network Interface Controller (NIC) module (NIC) configured to transmit/receive data via the network 300, and a decoder module (DEC) configured to output video/ANC data to the output device (the monitor) 500.

With this configuration, the video-processing system can transmit/receive compressed or uncompressed video data via the network 300 to output the video data acquired by the camera 400 to the display 500 in a remote location, for example.

Moreover, the video-processing apparatus 100 includes a mechanism configured to interconnect, at high speed, these modules via a relay unit and the internal bus. In order to realize interconnection among the modules, a PCIe Switch and a main memory are connected together via the CPU where firmware or the like operates.

The modules may be interconnected via the PCIe Switch and the main memory to exchange data between each module and the main memory.

The hardware configuration of the ENC will be described with reference to FIG. 2.

A DEMUX (the video data acquiring unit 102a) receives frame image data (video/ANC data) from the camera 400 or the like to separate such data into video data and ANC data.

A J2K Encoder (the video data acquiring unit 102a) compresses the video data output from the DEMUX according to a JPEG 2000 format to output a J2K Stream.

A MPEG2-TS (Video) (the video data acquiring unit 102a) outputs the J2K Stream output from the J2K Encoder as a MPEG2-TS (Transport Stream) packet.

A MPEG2-TS (ANC) (the video data acquiring unit 102a) outputs the ANC data output from the DEMUX as a MPEG2-TS packet.

A MUX (the video data acquiring unit 102a) arranges and output the MPEG2-TS packet output from the MPEG2-TS (Video) and the MPEG2-TS packet output from the MPEG2-TS (ANC).

A DMA RX (the video data acquiring unit 102a) writes the MPEG2-TS packets output from the MUX into the main memory.

As shown in FIG. 2, the camera 400 connected to the ENC transmits frame image data to the ENC based on a generator synchronization signal acquired from a reference signal supplied from the synchronization signal generator 200 connected via a coaxial cable or the like.

The synchronization signal generator 200 may be a SG-7811 (manufactured by Astrodesign Inc.) or a TG-700 (manufactured by TFF Corporation), for example.

The hardware configuration of the NIC will also be described with reference to FIG. 2.

A DEMUX TX (PCIe) (the network transmitting unit 102b) receives and analyze a PCIe packet output from the PCIe Switch to output such a packet to a DMA TX indicated by the destination address of the PCIe packet.

The DMA TX (the network transmitting unit 102b) reads the MPEG2-TS packet from the main memory to output such a packet to a SMPTE2022-1/-2 TX.

The SMPTE2022-1/-2 TX (the network transmitting unit 102b) receives the MPEG2-TS packet from the DMA TX to encapsulate (provide an IP/UDP/RTP header) such a packet into data according to SMPTE2022-1/-2 and output such data to an Arbiter TX.

The Arbiter TX (the network transmitting unit 102b) receives and arbitrates the data from each SMPTE2022-1/-2 TX to output such data to a 1 GbE/10 GbE TX.

The 1 GbE/10 GbE TX (the network transmitting unit 102b) receives a frame from the Arbiter TX to output such a frame to the external network 300.

A 1 GbE/10 GbE RX (the network receiving unit 102c) receives the data from the external network 300 to output such data to a DEMUX RX (1 GbE/10 GbE).

The DEMUX RX (1 GbE/10 GbE) (the network receiving unit 102c) receives and analyzes the frame from the 1 GbE/10 GbE RX to output such a frame to a SMPTE2022-1/-2 RX indicated by the destination address of the frame.

The SMPTE2022-1/-2 RX (the network receiving unit 102c) receives the frame from the DEMUX RX (1 GbE/10 GbE) to extract a MPEG2-TS packet and output such a packet to a DMA RX.

The DMA RX (the network receiving unit 102c) receives the MPEG2-TS packet from the SMPTE2022-1/-2 RX to write such a packet into the main memory via an Arbiter RX.

The Arbiter RX (the network receiving unit 102c) arbitrates and serializes a request for writing from the DMA RXs into the main memory to output such a request to the PCIe Switch.

The hardware configuration of the DEC will also be described with reference to FIG. 2.

A DMA TX (the output controlling unit 102h) reads a MPEG2-TS packet from the main memory to output such a packet to a DEMUX.

The DEMUX (the output controlling unit 102h) analyzes the MPEG2-TS packet to extract a MPEG2-TS (Video) packet and a MPEG2-TS (ANC) packet.

The DEMUX outputs the MPEG2-TS (Video) packet to a MPEG2-TS (Video) and to output the MPEG2-TS (ANC) packet to a MPEG2-TS (ANC).

The MPEG2-TS (Video) (the output controlling unit 102h) receives the MPEG2-TS (Video) packet from the DEMUX to convert the MPEG2-TS (Video) packet into a J2K Stream and output the J2K Stream to a J2K Decoder.

The J2K Decoder (the output controlling unit 102h) receives the J2K Stream from the MPEG2-TS (Video) to convert the J2K Stream into video data and output such data to a MUX.

The MPEG2-TS (ANC) (the output controlling unit 102h) receives the MPEG2-TS (ANC) packet from the DEMUX to convert the MPEG2-TS (ANC) packet into ANC data and output such data to the MUX.

The MUX (the output controlling unit 102h) receives the video data from the J2K Decoder and the ANC data from the PES (ANC) to multiplex the video data and the ANC data and output the multiplexed data to the external monitor (a multi-screen monitor or the like) 500 based on a synchronization signal.

A Sync Separator (the generator synchronization signal acquiring unit 102d) acquires a generator synchronization signal for synchronization of video data based on a reference signal supplied from the synchronization signal generator 200 connected to the DECs via a coaxial cable or the like.

An LVDS Transceiver (the synchronization signal selecting unit 102f) transmits a synchronization signal to other decoder modules (slave decoders or the like) via the internal bus.

As shown in FIG. 2, in conventional video frame display via the network 300, distortion of video data displayed on the multi-screen monitor 500 occurs when a head frame in the same frame of the video data acquired by the camera 400 is not subjected to any one or both of inter-channel synchronization and inter-module synchronization.

That is, in the system where as shown in FIG. 2, the transmitting device 100-1 includes a single ENC and the receiving device 100-2 includes three DECs, video data (frame image (2 columns×2 rows) data) acquired by a single camera 400 is output as the same video frame from three DECs, and then, is displayed on the multi-screen monitor 500.

Note that as shown in FIG. 2, when video output from the DEC (DEC #2 or the like) to which no reference signal (the common reference signal) is supplied from the synchronization signal generator 200 or the like is not synchronized, distortion of part of video of frame image data (frame image (6 columns×2 rows) data) occurs (e.g., ch-J to ch-M are not output).

For this reason, in the video-processing system of the present embodiment, a reference signal is supplied to any one of the DECs of the receiving device 100-2 so that the reference signal can be shared in the device, and therefore, it is controlled such that video data pieces output from the DECs are synchronized with each other.

Processing in the Present Embodiment

Figure 3:
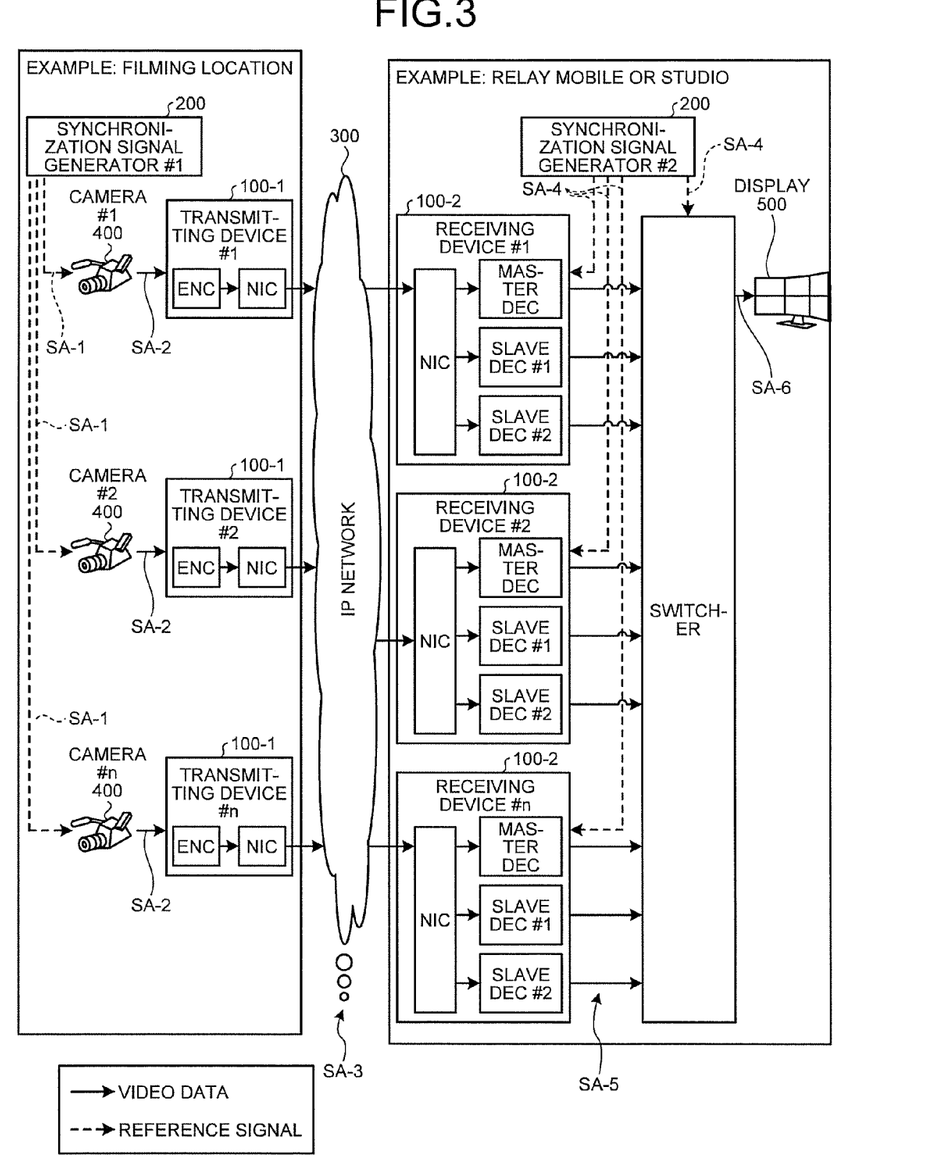
FIG. 3 is a flow diagram of an example of processing in the video-processing system of the embodiment.
Figure 4:
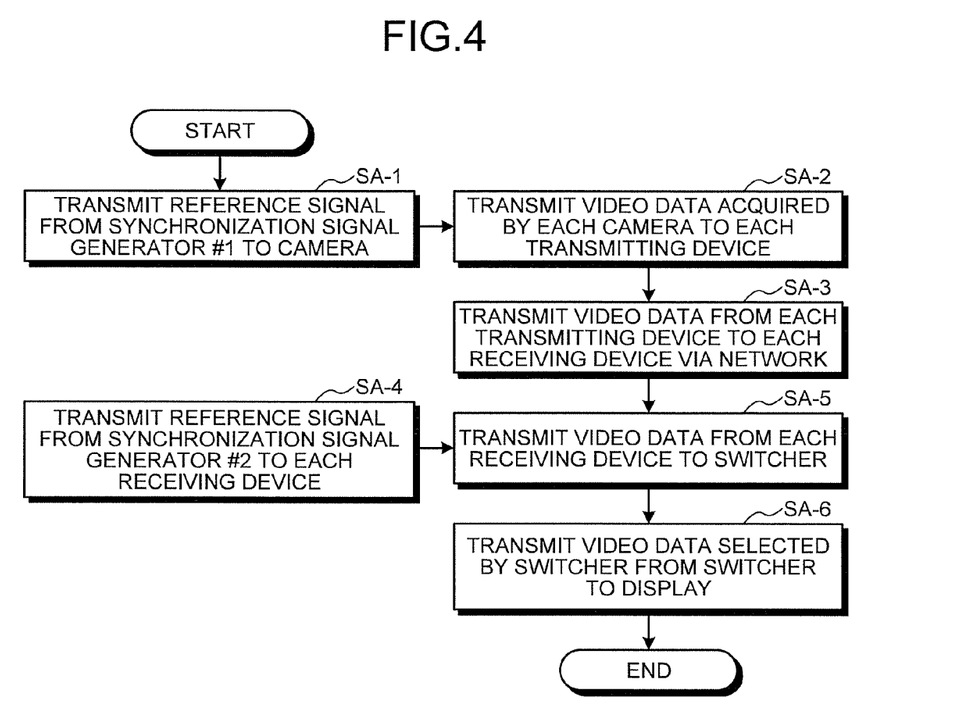
FIG. 4 is a flowchart of the example of the processing in the video-processing system of the embodiment.

An example of the processing executed in the video-processing system having the above-described configuration will be described with reference to FIGS. 3 to 8. FIG. 3 is a flow diagram of the example of the processing in the video-processing system of the present embodiment. FIG. 4 is a flowchart of the example of the processing in the video-processing system of the present embodiment.

As shown in FIGS. 3 and 4, a synchronization signal generator 200 #1 transmits a reference signal to each of cameras 400 #1 to #n in a filming location.

Each of the cameras 400 #1 to #n acquires a generator synchronization signal for synchronization of video data based on the reference signal (Step SA-1).

Then, each of the cameras 400 #1 to #n transmits the acquired video data to a corresponding one of transmitting devices 100-1 #1 to #n based on the generator synchronization signal.

Subsequently, an ENC of each of the transmitting devices 100-1 #1 to #n acquires the video data (Step SA-2).

Next, an NIC of each of the transmitting devices 100-1 #1 to #n transmits, via the network (an IP network) 300, the video data to a corresponding one of receiving devices 100-2 #1 to #n.

Then, an NIC of each of the receiving devices 100-2 #1 to #n receives the video data (Step SA-3).

That is, video data acquired by the cameras 400 may be transmitted from each transmitting device 100-1 to a corresponding one of the receiving devices 100-2 via the network 300.

A synchronization signal generator 200 #2 transmits a reference signal to the receiving devices 100-2 #1 to #n in a relay mobile or a studio and to a switcher (Step SA-4).

Then, a master DEC of each of the receiving devices 100-2 #1 to #n acquires a generator synchronization signal for synchronization of the video data based on the reference signal supplied from the synchronization signal generator 200 #2, and then, distributes a generator synchronization signal to slave DECs #1 and #2.

Subsequently, the master DEC and the slave DECs #1 and #2 in each of the receiving devices 100-2 #1 to #n transmit the video data to the switcher based on the generator synchronization signal (Step SA-5).

Figure 5:
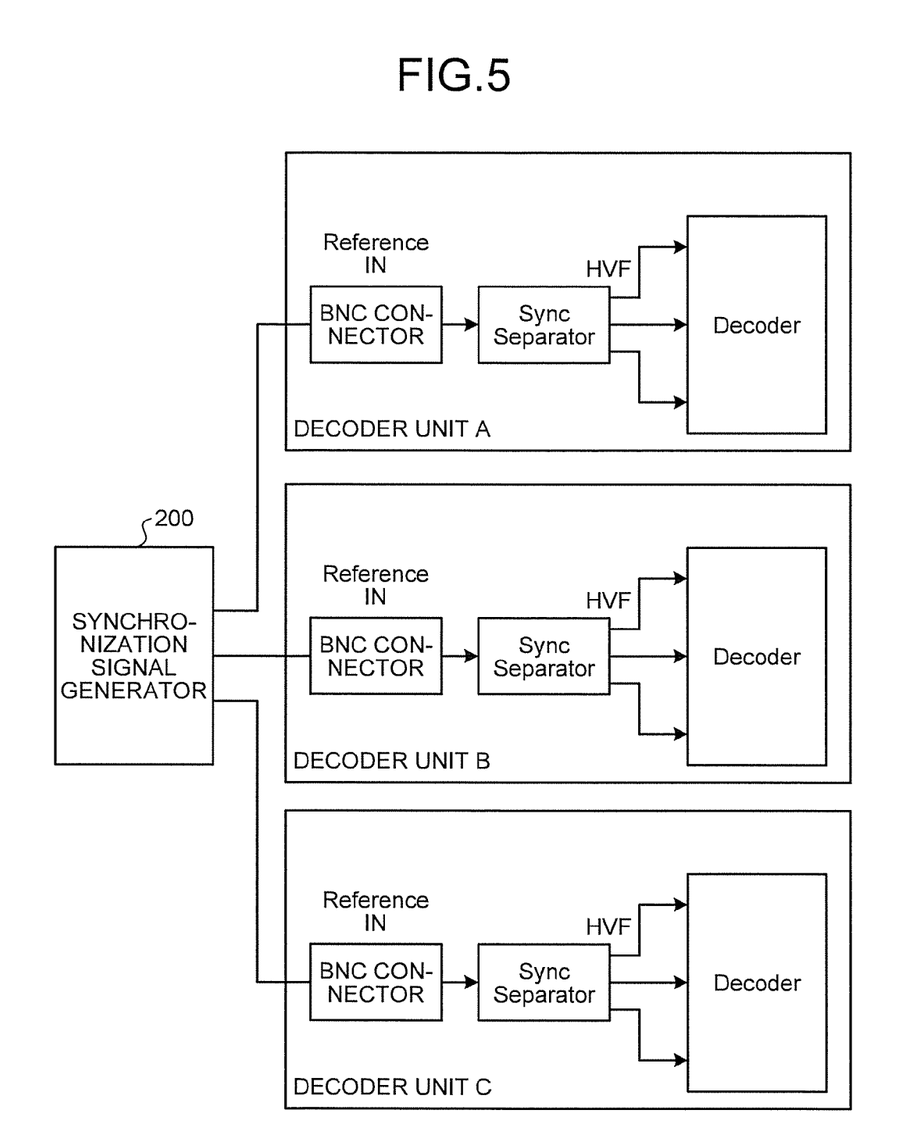
FIG. 5 is a diagram of an example of a conventional synchronization signal distribution system.
Figure 6:
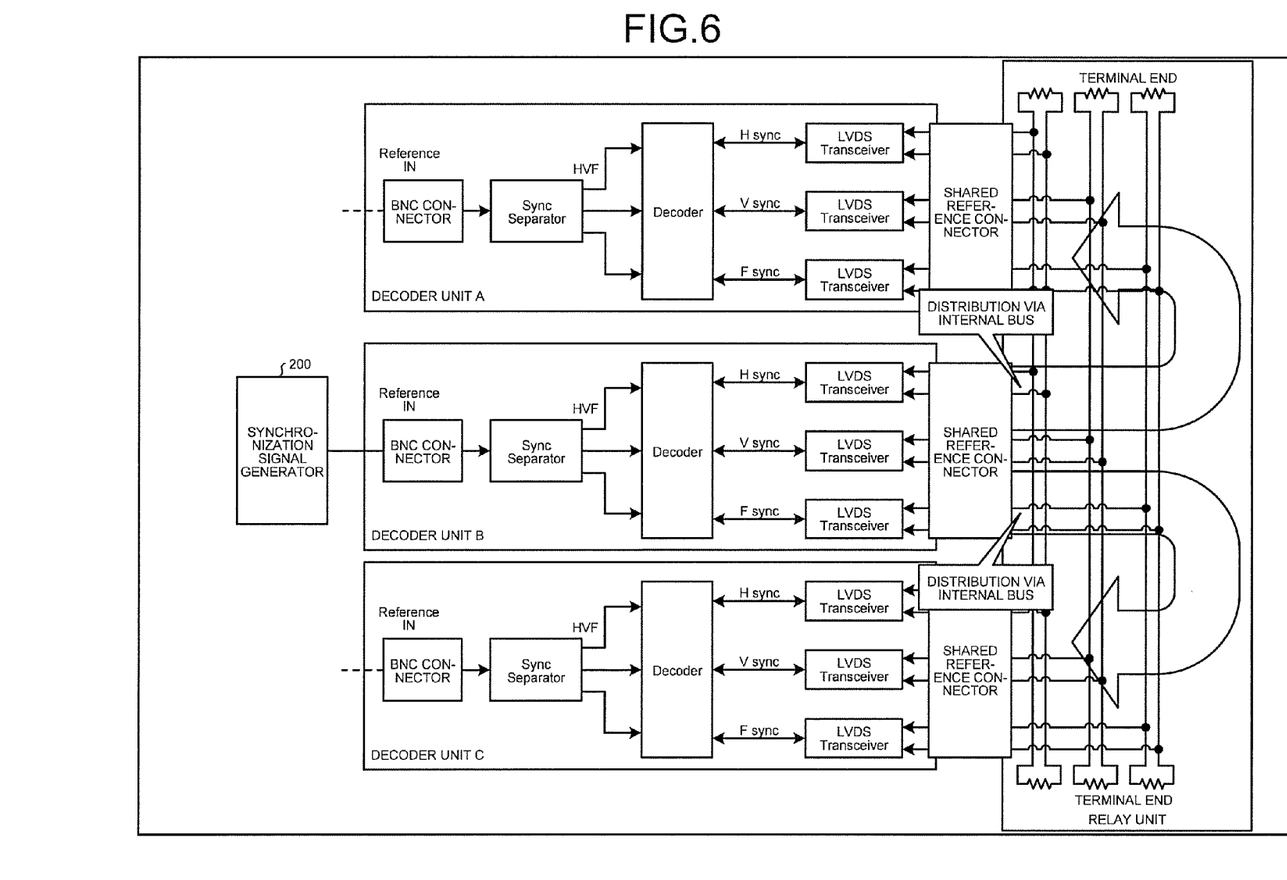
FIG. 6 is a diagram of an example of a synchronization signal distribution system of the embodiment.

An example of a synchronization signal distribution system of the present embodiment will be described with reference to FIGS. 5 and 6. FIG. 5 is a diagram of a conventional example of the synchronization signal distribution system. FIG. 6 is a diagram of the example of the synchronization signal distribution system of the present embodiment.

As shown in FIG. 5, thick heavy coaxial cables are conventionally connected from a synchronization signal generator 200 or the like to all DECs to supply a reference signal. That is, in the conventional case, a coaxial cable for connection to external equipment is required for each synchronization unit.

On the other hand, in the present embodiment, board wiring for distributing a reference signal via the relay unit and the internal bus is, as illustrated in FIG. 6, performed so that a single coaxial cable can be used for sharing of the reference signal from the synchronization signal generator 200 or the like in the device.

That is, in the present embodiment, the coaxial cable may be connected only to a single unit. Thus, in the present embodiment, a synchronization signal can be distributed to other DECs via the internal bus.

Returning to FIGS. 3 and 4, the switcher transmits the selected video data to a display 500 (Step SA-6), and then, the processing is ended.

That is, the switcher switches, among plural pieces of input video data, the video data to be output to the display 500. The reference signal is supplied from the synchronization signal generator 200 to each receiving device 100-2 and the switcher, thereby synchronizing all pieces of the video data output from the switcher.

Figure 7:
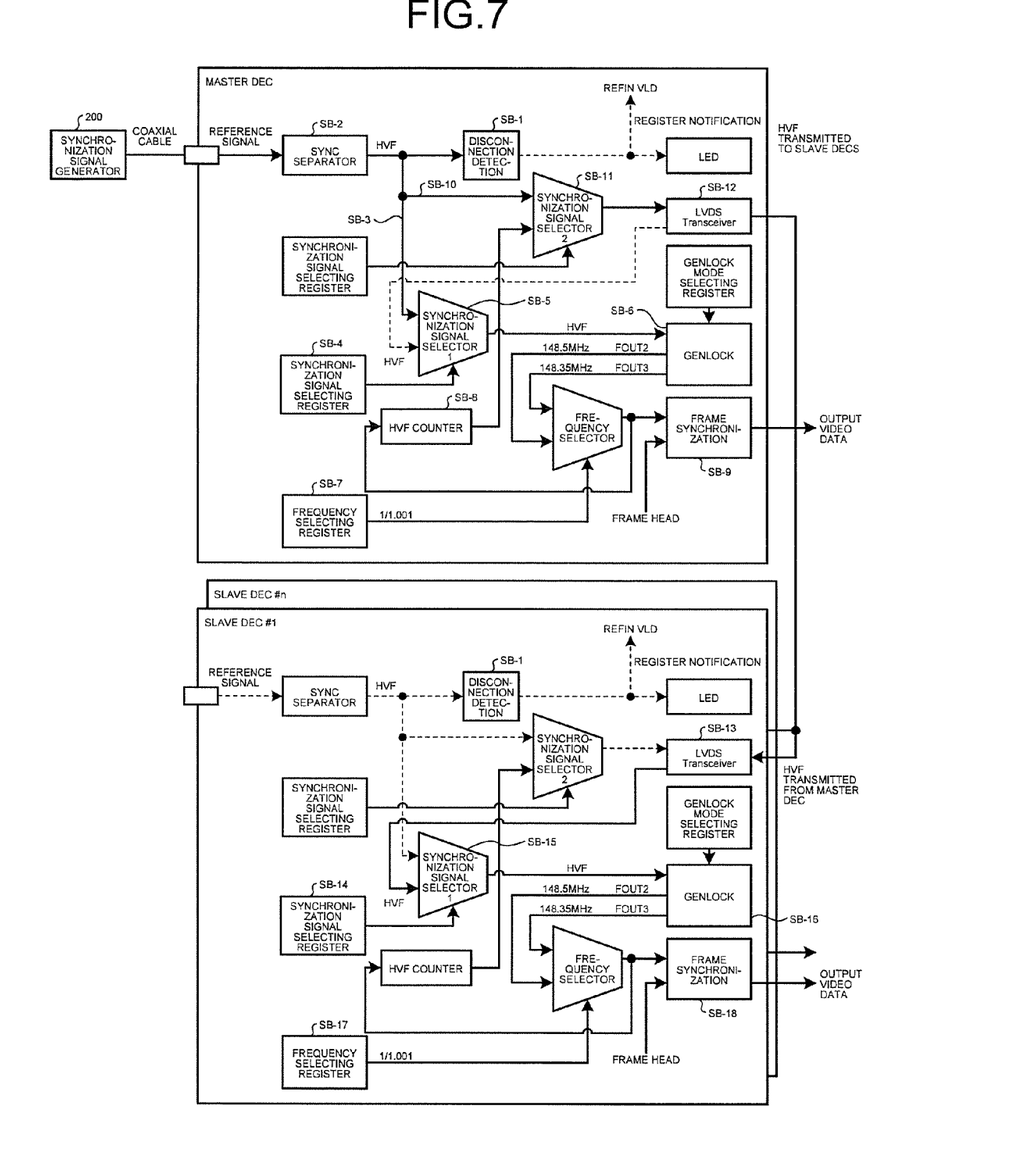
FIG. 7 is a selection control diagram of an example of synchronization signal selection processing in the embodiment.
Figure 8:
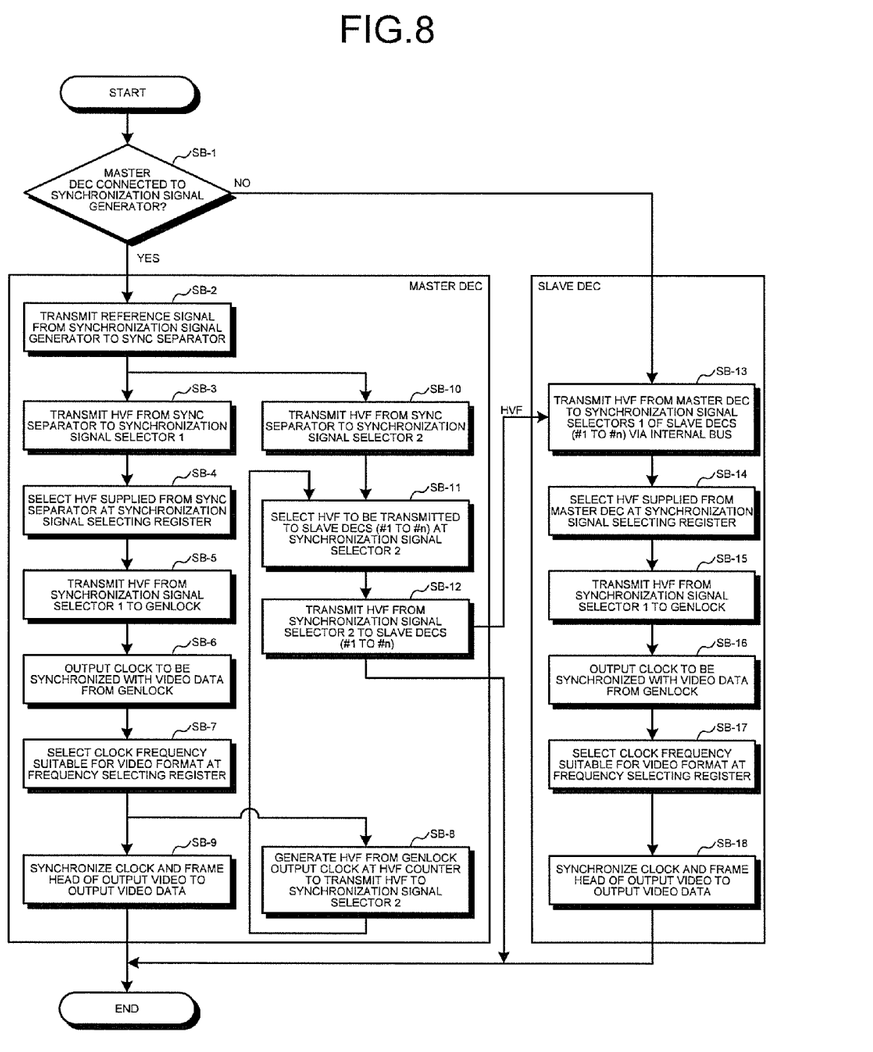
FIG. 8 is a flowchart of the example of the processing in the video-processing system.

An example of synchronization signal selection processing in the present embodiment will be described with reference to FIGS. 7 and 8. FIG. 7 is a selection control diagram of the example of the synchronization signal selection processing in the present embodiment. FIG. 8 is a flowchart of the example of the processing in the video-processing system of the present embodiment.

As shown in FIGS. 7 and 8, each DEC (the control unit 102) of the receiving device 100-2 first determines whether or not the synchronization signal generator 200 is connected (i.e., whether or not the DEC itself is the mater DEC) (step SB-1).

Then, when it is determined that the slave DECs #1 to #n (the control unit 102) of the receiving device 100-2 are not connected to the synchronization signal generator 200 (No at step SB-1), the processing is shifted to step SB-13.

On the other hand, when it is determined that the master DEC (the control unit 102) of the receiving device 100-2 is connected to the synchronization signal generator 200 (Yes at step SB-1), the processing is shifted to step SB-2.

Then, the Sync separator (the generator synchronization signal acquiring unit 102d) of the master DEC of the receiving device 100-2 acquires an HVF synchronization signal (a generator synchronization signal) for synchronization of video data based on a reference signal transmitted from the synchronization signal generator 200 (step SB-2), and then, the processing is shifted to steps SB-3 and SB-10.

That is, the Sync separator of the master DEC may extract a synchronization signal of H (start of a horizontal line), V (start of a field), and F (start of a new frame) from a reference signal supplied from the synchronization signal generator 200, the HVF synchronization signal containing timing data.

Then, the Sync separator of the master DEC of the receiving device 100-2 transmits the HVF synchronization signal (the generator synchronization signal) to a synchronization signal selector 1 (step SB-3).

Subsequently, a synchronization signal selecting register (the synchronization signal selecting unit 102f) of the receiving device 100-2 selects the HVF synchronization signal (the generator synchronization signal) supplied from the Sync separator to the synchronization signal selector 1 (step SB-4).

At this step, the synchronization signal selecting register of the DEC may select either one of an HVF synchronization signal transmitted from the Sync separator as an HVF synchronization signal to be input to a GENLOCK or an HVF synchronization signal transmitted from the master DEC via the internal bus.

That is, in the present embodiment, the path through which a synchronization signal is supplied may be selected and controlled.

Then, the synchronization signal selector 1 (the synchronization signal selecting unit 102f) of the master DEC of the receiving device 100-2 transmits the HVF synchronization signal (the generator synchronization signal) to the GENLOCK (step SB-5).

Subsequently, the GENLOCK (the control unit 102) of the master DEC of the receiving device 100-2 outputs a clock to be synchronized with the video data (step SB-6).

At this step, the GENLOCK may output a clock to be synchronized with the video data based on a GENLOCK mode selected by a GENLOCK mode selecting register of the DEC.

Specifically, in the case of supplying a reference signal from the outside, the master DEC and the slave DECs #1 to #n may operate in a GENLOCK lock mode (external synchronization).

In the case of supplying no reference signal from the outside, the master DEC may operate in a GENLOCK self-running mode (not using a signal from the outside), and the slave DECs #1 to #n operate may operate in the GENLOCK lock mode.

Then, a frequency selecting register (the video output clock selecting unit 102g) of the master DEC of the receiving device 100-2 selects a clock frequency suitable for a video format (step SB-7), and then, the processing is shifted to steps SB-8 and SB-9.

That is, the frequency selecting register may select a clock frequency of 148.5 MHz or 148.35 MHz suitable for the video format, for example.

Subsequently, an HVF counter (the synchronization signal generating unit 102e) of the master DEC of the receiving device 100-2 generates an HVF synchronization signal (a master synchronization signal) from the clock output from the GENLOCK to transmit the HVF synchronization signal (the master synchronization signal) to a synchronization signal selector 2 (step SB-8), and then, the processing is shifted to step SB-11.

The master DEC (the output controlling unit 102h) of the receiving device 100-2 performs synchronization between the clock and a head of a frame of the output video to output the video data (to the multi-screen monitor 500 or the like) (step SB-9), and then, the processing is ended.

The Sync separator of the master DEC of the receiving device 100-2 transmits the HVF synchronization signal (the generator synchronization signal) to the synchronization signal selector 2 (step SB-10).

Then, the synchronization signal selector 2 (the synchronization signal selecting unit 102f) of the master DEC of the receiving device 100-2 selects the HVF synchronization signal (the selected synchronization signal) to be transmitted to the slave DECs #1 to #n, the HVF synchronization signal being either one of the generator synchronization signal or the master synchronization signal (step SB-11).

That is, the synchronization signal selector 2 of the master DEC may select, as the synchronization signal to be transmitted to the slave DECs, either one of the HVF synchronization signal transmitted from the Sync separator or the HVF synchronization signal generated, at the HVF counter, from the clock output in the GENLOCK self-running mode.

Subsequently, the LVDS Transceiver (the synchronization signal selecting unit 102f) of the master DEC of the receiving device 100-2 transmits the HVF synchronization signal, which is transmitted from the synchronization signal selector 2, to the slave DECs #1 to #n via the internal bus (step SB-12), and then, the processing is ended.

In the case of receiving the HVF synchronization signal (the selected synchronization signal) transmitted from the master DEC via the internal bus, the LVDS Transceiver (the synchronization signal selecting unit 102f) of each of the slave DECs #1 to #n of the receiving device 100-2 transmits the HVF synchronization signal (the selected synchronization signal) to the synchronization signal selector 1 (step SB-13).

Then, the synchronization signal selecting register (the synchronization signal selecting unit 102f) of each of the slave DECs #1 to #n of the receiving device 100-2 selects the HVF synchronization signal (the selected synchronization signal) supplied from the master DEC (step SB-14).

Subsequently, the synchronization signal selector 1 (the synchronization signal selecting unit 102f) of each of the slave DECs #1 to #n of the receiving device 100-2 transmits the HVF synchronization signal (the selected synchronization signal) to the GENLOCK (step SB-15).

Then, the GENLOCK (the control unit 102) of each of the slave DECs #1 to #n of the receiving device 100-2 outputs the clock to be synchronized with the video data (step SB-16).

Subsequently, a frequency selecting register (the video output clock selecting unit 102g) of each of the slave DECs #1 to #n of the receiving device 100-2 selects a clock frequency suitable for the video format (step SB-17).

Then, each of the slave DECs #1 to #n (the output controlling units 102h) of the receiving device 100-2 performs synchronization between the clock and a head of a frame of the output video to output the video data (to the multi-screen monitor 500 or the like) (step SB-18), and then, the processing is ended.

As described above, in the present embodiment, even if no reference signal is supplied from the outside, the master DEC and the slave DECs #1 to #n can be synchronized with each other by the HVF synchronization signal output from the master DEC in such a manner that the master DEC is set in the GENLOCK self-running mode and that the slave DECs #1 to #n are set in the GENLOCK lock mode.

That is, not only in the case of supplying a reference signal from the outside, but also in the case of supplying no reference signal from the outside, the master DEC is set in the GENLOCK self-running mode so that the video data pieces output from the DEC units can be synchronized with each other.

The receiving device 100-2 is not the device for generating video, such as the camera 400. For this reason, in order to synchronize video data acquired by the camera 400 or the like with video data output to the display, the HVF synchronization signal from the synchronization signal generator 200 and the master DEC needs to be supplied to the GENLOCK.

Note that in a conventional device including a plurality of DECs (three DECs or the like), video data pieces output from the DECs are displayed as the same video frame.

In this case, it is required that a reference signal is supplied from a synchronization signal generator 200 or the like connected to each DEC of the device, an HVF synchronization signal is extracted from the reference signal, and then, frame heads of the video data are synchronized to output video to a display 500 or the like.

For this reason, the configuration in which a reference signal is supplied from a synchronization signal generator 200 or the like to any one of DECs has conventionally required the mechanism configured to synchronize video data output from such a DEC with video data output from other DEC(s).

Thus, in the present embodiment, interface connectors are provided at the relay unit, and the DECs are connected together via the internal bus. With this configuration, a synchronization signal can be distributed to all DECs of the device even in the video-processing apparatus 100 including the DECs if a reference signal is supplied to any one of the DECs.

Moreover, in the present embodiment, the DEC receiving a reference signal from the synchronization signal generator 200 or the like via the coaxial cable can select a synchronization signal output from the Sync separator to synchronize and control video data output, and can distribute the synchronization signal to other DECs via the internal bus.

Further, in the present embodiment, the DECs not connected to the synchronization signal generator 200 or the like can select a synchronization signal supplied via the internal bus to synchronize and control video data output.

Other Embodiments

The embodiment of the present disclosure has been explained so far. Besides the foregoing embodiment, the present disclosure can also be carried out in various different embodiments within the scope of the technical idea described in the claims.

For example, the video-processing apparatus 100 may perform processing in a standalone mode, or may perform processing according to a request from a client terminal (separate from the video-processing apparatus 100) and then return the results of the processing to the client terminal.

Out of the processes explained in relation to the embodiment, all or some of the processes explained as being automatically performed may be manually performed, or all or some of the processes explained as being manually performed may be automatically performed by publicly known methods.

Besides, the process steps, the control steps, the specific names, the information including registered data for the processes or parameters such as search conditions, the screen examples, or the database configurations described or illustrated herein or the drawings can be arbitrarily changed if not otherwise specified.

The constituent elements of the video-processing apparatus 100 shown in the drawings are conceptual functions and do not necessarily need to be physically configured as shown in the drawings.

For example, all or any part of the processing functions included in the units of the video-processing apparatus 100, in particular, the processing functions performed by the control unit 102 may be implemented by the CPU or programs interpreted and executed by the CPU, or may be implemented by wired logic-based hardware.

The programs including programmed instructions for causing a computer to execute methods according to the present disclosure described later are recorded in non-transitory computer-readable recording media, and are mechanically read by the video-processing apparatus 100 as necessary. Specifically, the computer programs for giving instructions to the CPU to perform various processes in cooperation with an operating system (OS) are recorded in the storage unit 106 such as a ROM or an HDD. The computer programs are loaded into the RAM and executed, and constitute a control unit in cooperation with the CPU.

The computer programs may be stored in an application program server connected to the video-processing apparatus 100 via an arbitrary network, and may be entirely or partly downloaded as necessary.

The programs according to the present disclosure may be stored in computer-readable recording media or may be formed as program products. The "recording media" include any portable physical media such as a memory card, a USB memory, an SD card, a flexible disc, a magneto optical disc, a ROM, an EPROM, an EEPROM, a CD-ROM, an MO, a DVD, and a Blu-ray (registered trademark) disc.

The "programs" constitute data processing methods described in an arbitrary language or by an arbitrary describing method, and are not limited in format such as source code or binary code. The "programs" are not limited to singly-configured ones but may be distributed into a plurality of modules or libraries or may perform their functions in conjunction with another program typified by an OS. Specific configurations for reading the recording media by the units according to the embodiment, specific procedures for reading the programs, or specific procedures for installing the read programs may be well-known configurations or procedures.

The various databases and others stored in the storage unit 106 may be storage units such as any one, some, or all of a memory device such as a RAM or a ROM, a fixed disc device such as a hard disc, a flexible disc, and an optical disc, and may store any one, some, or all of various programs, tables, databases, and web page files for use in various processes and web site provision.

The video-processing apparatus 100 may be an information processing apparatus such as a well-known personal computer or work station, and arbitrary peripherals may be connected to the information processing apparatus. The video-processing apparatus 100 may be embodied by providing the information processing apparatus with software (including programs, data, and the like) for implementing the methods according to the present disclosure.

Further, the specific modes of distribution and integration of the devices are not limited to the ones illustrated in the drawings but all or some of the devices may be functionally or physically distributed or integrated by arbitrary unit according to various additions and the like or functional loads. That is, the foregoing embodiments may be carried out in arbitrary combination or may be selectively carried out.

In the present disclosure, a reference signal is supplied to any one of modules configured to output video data so that the reference signal can be shared in the device.

According to the present disclosure, sharing of a reference signal in the device can be realized by a single coaxial cable. That is, according to the present disclosure, a reference signal is supplied to any one of the decoder modules so that video data pieces output from all decoder modules mounted in the device can be synchronized with each other.

Moreover, according to the present disclosure, a reference signal can be shared in the device by using a single coaxial cable. A single video channel from a camera or the like is transmitted/received via the network so that video can be displayed on a single large multi-screen monitor without distortion.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A video-processing apparatus comprising:
a master decoder serving as a decoder module connected to a synchronization signal generator; and
a slave decoder serving as a decoder module not connected to the synchronization signal generator, wherein the master decoder includes:
a generator synchronization signal acquiring unit that acquires a generator synchronization signal for synchronization of video data based on a reference signal supplied from the synchronization signal generator,
a synchronization signal selecting unit that selects the generator synchronization signal as a selected synchronization signal to transmit the selected synchronization signal to the slave decoder via an internal bus, and
a master output controlling unit that outputs the video data based on the selected synchronization signal, and
the slave decoder includes:
a slave output controlling unit that outputs the video data based on the selected synchronization signal transmitted from the master decoder, wherein the master decoder further includes:
a synchronization signal generating unit that generates a master synchronization signal different from the generator synchronization signal, and
the synchronization signal selecting unit selects the generator synchronization signal or the master synchronization signal as the selected synchronization signal to transmit the selected synchronization signal to the slave decoder via the internal bus.

2. The video-processing apparatus according to claim 1, wherein
the slave output controlling unit synchronizes a video output clock and a head of a frame with each other based on the selected synchronization signal to output the video data.

3. The video-processing apparatus according to claim 1, wherein
the master output controlling unit synchronizes a video output clock and a head of a frame with each other based on the selected synchronization signal to output the video data.

4. The video-processing apparatus according to claim 2, wherein
the decoder module further includes:
a video output clock selecting unit that selects the video output clock based on a video format of the video data.

5. The video-processing apparatus according to claim 1, wherein
the reference signal matches a reference signal supplied from a photographing-side synchronization signal generator to a photographing device connected to the photographing-side synchronization signal generator and configured to acquire the video data.

6. A video-processing system in which a transmitting device connected to a photographing device connected to a photographing-side synchronization signal generator and configured to acquire video data and a receiving device including a master decoder serving as a decoder module connected to a decoder-side synchronization signal generator and a slave decoder serving as a decoder module not connected to the decoder-side synchronization signal generator are communicatively connected together, wherein the transmitting device includes:
a video data acquiring unit that acquires the video data transmitted from the photographing device based on a generator synchronization signal acquired from a reference signal supplied from the photographing-side synchronization signal generator, and
a network transmitting unit that transmits the video data via a network, and
the receiving device includes:
a network receiving unit that receives the video data via the network, the master decoder including:
a generator synchronization signal acquiring unit that acquires a generator synchronization signal for synchronization of the video data based on a reference signal supplied from the decoder-side synchronization signal generator connected to the master decoder,
a synchronization signal selecting unit that selects the generator synchronization signal as a selected synchronization signal to transmit the selected synchronization signal to the slave decoder via an internal bus, and
a master output controlling unit that outputs the video data based on the selected synchronization signal, and
the slave decoder including:
a slave output controlling unit that outputs the video data based on the selected synchronization signal transmitted from the master decoder, wherein the master decoder further includes:
a synchronization signal generating unit that generates a master synchronization signal different from the generator synchronization signal, and
the synchronization signal selecting unit selects the generator synchronization signal or the master synchronization signal as the selected synchronization signal to transmit the selected synchronization signal to the slave decoder via the internal bus.

7. The video-processing system according to claim 6, wherein
the slave output controlling unit synchronizes a video output clock and a head of a frame with each other based on the selected synchronization signal to output the video data.

8. The video-processing system according to claim 6, wherein
the master output controlling unit synchronizes a video output clock and a head of a frame with each other based on the selected synchronization signal to output the video data.

9. The video-processing system according to claim 7, wherein
the decoder module further includes:
a video output clock selecting unit that selects the video output clock based on a video format of the video data.

10. The video-processing system according to claim 6, wherein
the reference signal supplied to the receiving device matches the reference signal supplied to the photographing device.

11. A video-processing method executed by a video-processing apparatus including:
a master decoder serving as a decoder module connected to a synchronization signal generator, and a slave decoder serving as a decoder module not connected to the synchronization signal generator,
the method executed by the video-processing apparatus comprising:
a generator synchronization signal acquiring step of acquiring a generator synchronization signal for synchronization of video data based on a reference signal supplied from the synchronization signal generator at the master decoder;
a synchronization signal selecting step of selecting the generator synchronization signal as a selected synchronization signal to transmit the selected synchronization signal to the slave decoder via an internal bus at the master decoder;
a master output controlling step of outputting the video data based on the selected synchronization signal at the master decoder; and
a slave output controlling step of outputting the video data based on the selected synchronization signal transmitted from the master decoder at the slave decoder, wherein
the method further comprising:
a synchronization signal generating step of generating a master synchronization signal different from the generator synchronization signal at the master decoder, and
at the synchronization signal selecting step, the generator synchronization signal or the master synchronization signal is selected as the selected synchronization signal and the selected synchronization signal is transmitted to the slave decoder via the internal bus.

12. The video-processing method according to claim 11, wherein
at the slave output controlling step, a video output clock and a head of a frame are synchronized with each other based on the selected synchronization signal and the video data is outputted.

13. The video-processing method according to claim 11, wherein
at the master output controlling step, a video output clock and a head of a frame are synchronized with each other based on the selected synchronization signal and the video data is outputted.

14. The video-processing method according to claim 12, wherein
the method further comprising:
a video output clock selecting step of selecting the video output clock based on a video format of the video data at the decoder module.

15. The video-processing method according to claim 11, wherein
the reference signal matches a reference signal supplied from a photographing-side synchronization signal generator to a photographing device connected to the photographing-side synchronization signal generator and configured to acquire the video data.

* * * * *